(12) United States Patent
Ballai et al.

(10) Patent No.: US 8,737,962 B2
(45) Date of Patent: May 27, 2014

(54) METHOD AND SYSTEM FOR PREVENTING ILLICIT USE OF A TELEPHONY PLATFORM

(71) Applicant: Twilio, Inc., San Francisco, CA (US)

(72) Inventors: Adam Ballai, San Francisco, CA (US); Robert C. Hagemann, III, San Francisco, CA (US); Daniel Zarick, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 13/949,984

(22) Filed: Jul. 24, 2013

(65) Prior Publication Data

US 2014/0045456 A1 Feb. 13, 2014

Related U.S. Application Data

(60) Provisional application No. 61/675,156, filed on Jul. 24, 2012.

(51) Int. Cl.
*H04M 1/66* (2006.01)

(52) U.S. Cl.
USPC ............ 455/410; 455/405; 455/406; 455/411

(58) Field of Classification Search
CPC ......... H04W 12/12; G06F 21/00; H04M 3/38
USPC ............... 455/405, 406, 410, 411; 705/14.26, 705/14.47, 26.35; 379/189, 127.02
See application file for complete search history.

(56) References Cited

U.S. PATENT DOCUMENTS

| | | | |
|---|---|---|---|
| 5,274,700 A | 12/1993 | Gechter et al. |
| 5,526,416 A | 6/1996 | Dezonno et al. |
| 5,581,608 A | 12/1996 | Jreij et al. |
| 5,598,457 A | 1/1997 | Foladare et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

Complaint for Patent Infringement, *Telinit Technologies, LLC v. Twilio Inc.*, dated Oct. 12, 2012.

*Primary Examiner* — Wayne Cai

(74) *Attorney, Agent, or Firm* — Jefrrey Schox; Brian Van Osdol

(57) ABSTRACT

A system and method for preventing illicit use of a telephony platform that includes enrolling a plurality of accounts on a telecommunications platform, wherein an account includes account configuration; at a fraud detection system of the telecommunications platform, receiving account usage data, wherein the usage data includes at least communication configuration data and billing configuration data of account configuration and further includes communication history of the plurality of accounts; calculating fraud scores of a set of fraud rules from the usage data, wherein at least a sub-set of the fraud rules include conditions of usage data patterns between at least two accounts; detecting when the fraud scores of an account satisfy a fraud threshold; and initiating an action response when a fraud score satisfies the fraud threshold.

12 Claims, 8 Drawing Sheets

(56) References Cited

U.S. PATENT DOCUMENTS

| | | |
|---|---|---|
| 6,223,287 B1 | 4/2001 | Douglas et al. |
| 6,269,336 B1 | 7/2001 | Ladd et al. |
| 6,425,012 B1 | 7/2002 | Trovato et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,832 B1 | 12/2002 | Saylor et al. |
| 6,507,875 B1 | 1/2003 | Mellen-Garnett et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B1 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,111,163 B1 | 9/2006 | Haney |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,330,890 B1 | 2/2008 | Partovi et al. |
| 7,340,040 B1 | 3/2008 | Saylor et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,397 B1 | 11/2008 | Saylor et al. |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,672,295 B1 | 3/2010 | Andhare et al. |
| 7,675,857 B1 | 3/2010 | Chesson |
| 7,882,253 B2 | 2/2011 | Pardo-Castellote et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,150,918 B1 | 4/2012 | Edelman et al. |
| 8,266,327 B2 | 9/2012 | Kumar et al. |
| 8,326,805 B1 | 12/2012 | Arous et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0077833 A1 | 6/2002 | Arons et al. |
| 2002/0126813 A1 | 9/2002 | Partovi et al. |
| 2003/0006137 A1 | 1/2003 | Wei et al. |
| 2003/0018830 A1 | 1/2003 | Chen et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0059020 A1 | 3/2003 | Meyerson et al. |
| 2003/0061404 A1 | 3/2003 | Atwal et al. |
| 2003/0088421 A1 | 5/2003 | Maes et al. |
| 2003/0123640 A1 | 7/2003 | Roelle et al. |
| 2003/0211842 A1 | 11/2003 | Kempf et al. |
| 2003/0231647 A1 | 12/2003 | Petrovykh |
| 2004/0071275 A1 | 4/2004 | Bowater et al. |
| 2004/0101122 A1 | 5/2004 | Da Palma et al. |
| 2004/0172482 A1 | 9/2004 | Weissman et al. |
| 2004/0213400 A1 | 10/2004 | Golitsin et al. |
| 2005/0010483 A1 | 1/2005 | Ling |
| 2005/0025303 A1 | 2/2005 | Hostetler |
| 2005/0038772 A1 | 2/2005 | Colrain |

(56) References Cited

U.S. PATENT DOCUMENTS

| | | |
|---|---|---|
| 2005/0135578 A1 | 6/2005 | Ress et al. |
| 2005/0177635 A1 | 8/2005 | Schmidt et al. |
| 2005/0240659 A1 | 10/2005 | Taylor |
| 2005/0243977 A1 | 11/2005 | Creamer et al. |
| 2005/0246176 A1 | 11/2005 | Creamer et al. |
| 2006/0015467 A1 | 1/2006 | Morken et al. |
| 2006/0047666 A1 | 3/2006 | Bedi et al. |
| 2006/0067506 A1 | 3/2006 | Flockhart et al. |
| 2006/0143007 A1 | 6/2006 | Koh et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0256816 A1 | 11/2006 | Yarlagadda et al. |
| 2006/0262915 A1 | 11/2006 | Marascio et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | Mcqueen |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0153711 A1 | 7/2007 | Dykas et al. |
| 2007/0192629 A1 | 8/2007 | Saito |
| 2007/0208862 A1 | 9/2007 | Fox et al. |
| 2007/0242626 A1 | 10/2007 | Altberg et al. |
| 2007/0265073 A1 | 11/2007 | Novi et al. |
| 2007/0286180 A1 | 12/2007 | Marquette et al. |
| 2007/0291905 A1 | 12/2007 | Halliday et al. |
| 2008/0040484 A1 | 2/2008 | Yardley |
| 2008/0091843 A1 | 4/2008 | Kulkarni |
| 2008/0104348 A1 | 5/2008 | Kabzinski et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0209050 A1 | 8/2008 | Li |
| 2008/0232574 A1 | 9/2008 | Baluja et al. |
| 2008/0256224 A1 | 10/2008 | Kaji et al. |
| 2008/0313318 A1 | 12/2008 | Vermeulen et al. |
| 2008/0317222 A1 | 12/2008 | Griggs et al. |
| 2009/0052437 A1 | 2/2009 | Taylor et al. |
| 2009/0052641 A1 | 2/2009 | Taylor et al. |
| 2009/0074159 A1 | 3/2009 | Goldfarb et al. |
| 2009/0075684 A1 | 3/2009 | Cheng et al. |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1* | 5/2009 | Gavan et al. .................. 379/189 |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0252159 A1 | 10/2009 | Lawson et al. |
| 2010/0037204 A1 | 2/2010 | Lin et al. |
| 2010/0070424 A1* | 3/2010 | Monk .......................... 705/318 |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0281108 A1 | 11/2010 | Cohen |
| 2011/0029882 A1 | 2/2011 | Jaisinghani |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0096673 A1 | 4/2011 | Stevenson et al. |
| 2011/0176537 A1 | 7/2011 | Lawson et al. |
| 2011/0211679 A1 | 9/2011 | Mezhibovsky et al. |
| 2011/0255675 A1 | 10/2011 | Jasper et al. |
| 2011/0276892 A1 | 11/2011 | Jensen-Horne et al. |
| 2011/0280390 A1 | 11/2011 | Lawson et al. |
| 2011/0283259 A1 | 11/2011 | Lawson et al. |
| 2011/0299672 A1 | 12/2011 | Chiu et al. |
| 2011/0320550 A1 | 12/2011 | Lawson et al. |
| 2012/0036574 A1 | 2/2012 | Heithcock et al. |
| 2012/0201238 A1 | 8/2012 | Lawson et al. |
| 2012/0226579 A1* | 9/2012 | Ha et al. ...................... 705/26.35 |
| 2012/0281536 A1 | 11/2012 | Gell et al. |
| 2012/0288082 A1 | 11/2012 | Segall |
| 2012/0290706 A1 | 11/2012 | Lin et al. |
| 2013/0156024 A1 | 6/2013 | Burg |

FOREIGN PATENT DOCUMENTS

| | | |
|---|---|---|
| EP | 1464418 A | 10/2004 |
| EP | 1770586 A1 | 4/2007 |
| ES | 2134107 A | 9/1999 |
| WO | 02087804 | 11/2002 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

* cited by examiner

| Fraud Points | Item to Track | Threshold | Time Period | Account Age |
|---|---|---|---|---|
| 25 | International calls longer than 20 minutes | > 3 concurrent | all time | all time |
| 75 | Avg. length of international call | > 60 minutes | all time | all time |
| 77 | Time from account creation to upgrade | < 24 hours | - | < 3 hours |
| 23 | Number of credit cards on account | > 3 | all time | all time |
| 32 | Credit card used across | > 3 accounts | all time | all time |
| 66 | IP address used across | > 3 accounts | all time | all time |
| 64 | High phone number prefix similarity (4+ digits) | > 20% of calls or SMS | | |
| 41 | Total Number of international calls | > 200 | all time | < 24 hours |
| 51 | All credit cards on account | > 3 CC names | all time | all time |
| 29 | IP address country != credit card country | all time | all time | all time |
| 74 | Total sales | > $200 | past 1 day | < 14 days |

FIGURE 9

METHOD AND SYSTEM FOR PREVENTING ILLICIT USE OF A TELEPHONY PLATFORM

CROSS-REFERENCE TO RELATED APPLICATIONS

This application claims the benefit of U.S. Provisional Application Ser. No. 61/675,156, filed on 24 Jul. 2012, which is incorporated in its entirety by this reference.

TECHNICAL FIELD

This invention relates generally to the telephony field, and more specifically to a new and useful method and system for preventing illicit use of a telephony platform in the telephony field.

BACKGROUND

Telephone fraud has long been a problem for telephony systems. With the introduction of VoIP networks and Session Initiation Protocol (SIP) trunks, the opportunities for telephony fraud is even greater. The recent development of new telephony platforms that enable a wider range of developers to create useful products also enables nefarious parties to create programs that commit telephony fraud. As one example, toll fraud has become a common problem on telephony platforms due in part to easier access to disposable telephone numbers. Other forms of telephony fraud can result in chargebacks for telephony platform providers when the telephony fraud involves stolen credit cards. Yet other forms of telephony fraud use valuable resources for improper uses that would otherwise be used for legitimate applications. Telephony fraud can be damaging to users that fall victim to the telephony frauds, to the profitability of telephony platforms, and to the performance of legitimate telephony applications. Furthermore, as developers are more frequently building on top of other infrastructure, those developers may not have access to the raw information to prevent such illicit use of their applications. Thus, there is a need in the telephony field to create a new and useful method and system for preventing illicit use of a telephony platform. This invention provides such a new and useful method and system.

BRIEF DESCRIPTION OF THE FIGURES

FIG. 9 is a table depicting a fraud rule set of an exemplary implementation of a preferred embodiment of the invention.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Preventing Illicit Use of a Communication Platform

Figure 1:
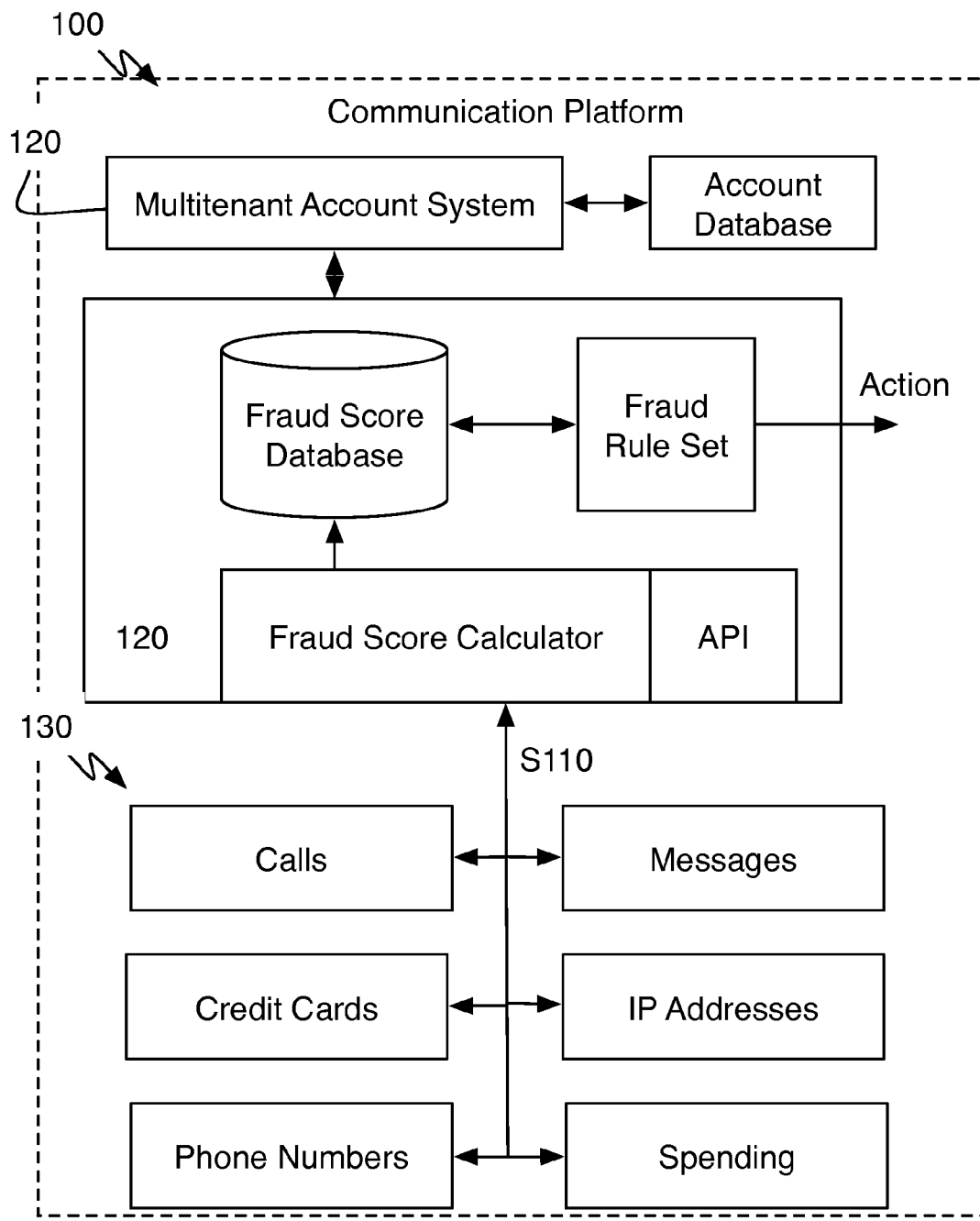
FIG. 1 is a schematic representation of a system of a preferred embodiment of the invention.

As shown in FIG. 1, a system for preventing illicit use of a communication platform of a preferred embodiment can include a communication platform 100 that includes a multitenant account system 110 and a fraud scoring system 120 communicatively coupled to operational components 130 of the communication platform. The system functions to apply various fraud-based heuristics across the accounts and/or subaccounts of the platform 100, monitor and measure the scores based on the heuristics, and alter operation of the account within the communication platform. Such a system is preferably capable of mitigating fraudulent behavior made on top of a self sign-up communication platform. In one scenario, the system can be applied to preventing illicit use within a single account. The system can additionally be extended to detect illicit use through cooperative use of multiple accounts. Another aspect is that the multitenant account system may include functionally for an account to create sub-accounts. Sub-accounts can be used so that a developer can develop a service on top of the communication platform and provide that service to end customers. The system can enable fraudulent behavior within the subaccount of an account to also be monitored for fraudulent behavior.

The communication platform 100 functions as the main infrastructure on which fraud is sought to be prevented or reduced. The communication platform is more preferably a telecommunication platform that facilitates synchronous voice communication sessions, synchronous video communication sessions, screen-sharing session, asynchronous text or media communication. In particular traditional telecommunication protocols such as telephone based networks (e.g., PSTN) or carrier based messaging (e.g., SMS or MMS) are of particular attention in the prevention of fraud. The ecosystem of traditional telecommunication protocols includes user contracts and network/carrier contracts to facilitate interoperability and functioning of the communication network as a whole. The communication platform 100 in some variations may provide a way for account holders to avoid the various contract related restrictions usually involved in using the network. For example, an account may be created and used through self sign-up, avoiding a contract lock-in or enrollment process. As described below accounts can additionally acquire and drop communication endpoints on-demand. The fraud scoring system preferably functions to ensure that such beneficial features are not leveraged in implementing toll fraud, spamming techniques, scams, or other illicit uses of the communication platform 100.

The communication platform 100 can provide any suitable service. In one variation, the communication platform 100 provides routing functionality. In another variation, the communication platform 100 may provide communication bridging between at least two protocols such as a PSTN device talking to a SIP based device. In a preferred embodiment, the communication platform 100 provides communication application functionality and/or API based integration to communication sessions, events, and resources. The communication platform preferably enables accounts to configure applications to be responsive to incoming communications. The communication platform 100 can additionally facilitate initiating outbound communications to be controlled by an application or connected to an agent. The applications are preferably internet hosted telephony instruction documents hosted externally by the developers (e.g., the account holder). The applications are preferably configured as URI mappings within an account that relate an endpoint with an application URI. The URI based applications preferably enable web developers to easily apply web-based application skills to building dynamic telephony applications. The communication application platform is preferably substantially similar to the one described in U.S. Pat. No. 8,306,021, issued 6 Nov. 2012, which is hereby incorporated in its entirety by this reference. The communication platform 100 may alternatively be focused on providing some features directed at a targeted use case. For example, the communication platform 100 may be a customer service platform used by customers to build call centers. The communication platform 100 may be a conference call service, a personal voicemail system, a notification service, a two-factor authentication facilitating service, and/or any suitable type of communication platform.

The multitenant account system 110 functions to manage and facilitate the accounts within the communication platform 100. As described above, the communication platform 100 is preferably a multitenant infrastructure in that multiple users can independently operate on shared resources of the communication platform. Preferably, any given account is prevented from impacting the resources of others within a multitenant system. The account system no preferably includes a user interfaced and/or programming interface (API) to create and manage an account. The communication platform will often involve paid use of communication infrastructure. The account system may include a billing engine that stores payment information of the account. Within an individual account, at least one endpoint is preferably assigned as a communication address. The communication endpoint is preferably a phone number, but may alternatively be a SIP address, a user name, or any communication address. The account system 110 or an endpoint service may additionally facilitate an account from acquiring new endpoints, porting outside endpoints for use within the platform, and/or canceling endpoints. The account system 110 can additionally manage operational configuration such as storing resources, references to resources, parameter settings, or other aspects used in account usage of the communication platform 100. Preferably, the configuration can store the application URIs mapped to endpoints of the account.

Additionally, the multitenant account system no can include a sub-account system such that a hierarchy of accounts can be created. A first account (i.e., a parent account) can preferably create or contain multiple sub-accounts (i.e., children accounts). Sub-accounts may be created through an interface by the sub-account holder or alternatively through an API by the parent account holder. For example, an application developer may create a customer service application, and then allow end users to signup as customers within his account. The sub-accounts will preferably operate within the scope of the parent account. The sub-accounts can be customized by the parent account and/or customized by sub-account holder. In one implementation, the sub-account system may functions similarly to the system and method described in U.S. patent application Ser. No. 13/167,569, filed 23 Jun. 2011, which is hereby incorporated in its entirety by this reference.

The fraud scoring system 120 functions to monitor, measure, and detect instances of illicit use that occur within or through the communication platform. The fraud scoring system 120 may predominantly focus on preventing continued illicit use of the communication platform 100 that is initiated by an account and/or a parent account of the communication platform 100. The fraud scoring system 120 can additionally identify and prevent illicit actions initiated by parties outside of the platform but occurring through the communication platform 100.

The fraud score preferably includes a set of fraud rules. The fraud rules are preferably conditions that either act as a metric upon which a score is based. The scores of the various fraud rules are preferably collectively analyzed to determine if fraud is occurring. A fraud rule in one variation is used in calculating a scalar measurement of one dimension or indicator of fraud. A fraud rule may alternatively be set of discrete conditions with an assigned score based on the determined condition. Preferably, this will be binary decision of assigning a fraud score or not. The fraud rules can target various aspects of communication and account usage and configuration. The fraud rules may simply evaluate indicators of fraud within an account or sub-account. Additionally, the fraud rules may include analysis across accounts/sub-accounts to detect patterns of illicit use implemented using multiple accounts. The fraud rules may be preconfigured or automatically generated based on algorithmically learned patterns in fraud or anomaly detection. The fraud scoring system no may additionally include an analyst-facilitated user interface wherein new rules can be created and issues can be manually ignored or acted upon, which functions to supplement automatic operation with human insight.

The set of fraud scores can include a wide variety of rules that use a variety of data sources. The data sources may include communication history such as involved endpoints, duration of the communication, content of the communication, frequency of the communications, geographic information of the communication, and other logged information. Some of the conditions may be based on static configuration parameters (i.e., how the account is setup). If an entity is implementing illicit behavior across multiple accounts similar resources are preferably used, and thus similarities of account settings across multiple accounts may be a sign of suspicious abnormal behavior. Other conditions may be based on usage of the account.

Another data source may include billing information such as the number of credit cards on the account, the number of accounts that use a particular credit card, number of names used on credit cards of an account, number or frequency of changes to billing information, country of IP address matched against credit card country, geographic region diversity of billing address, and other billing related information. The billing data source may be from a billing system of the communication platform. Outside data sources may additionally or alternatively be used. For example a data source with stolen or flagged credit card information can be used.

Yet another data source can include endpoints of an account. Patterns in endpoints may relate to the variety of owned or used endpoints by an account, variety of endpoints of incoming communication, variety of endpoints in outgoing communication, number or percentage of communications that are international, types of endpoints (e.g., short codes, mobile numbers, landlines, business numbers, etc.)

In the variation where the communication platform is a communication application platform, the application configuration can be another data source used in fraud rule conditions. Preferably, an application parameter is set within an account to reference the application resource (e.g., a document with the communication instructions). The application parameter is preferably a URI string that points to an application server of the account holder. The number of times the URI is used in different accounts may be the basis of a fraud rule condition. The application parameter may alternatively be a binary data file or executable code, and the raw application resource can be compared to other. For example, a cryptographic hash or fingerprint may be generated and used in comparing applications across accounts or sub-accounts. While static application configuration may be used, applications may be able to redirect application state control to other URIs and thus the fraud rule condition may be based on the URIs that are used throughout the processing of a communication session.

Similar to the fraud rules based on application configuration, media resource usage can additionally be used. If two or more accounts or sub-accounts, are using the same media resources, then those may be assumed to be operated by the same entity.

In addition to the data source, the time period in which the pattern is detected, age of the account, number of accounts, percentage of usage that is not flagged as suspicious and other qualifying conditions may provide additional context to the data source conditions.

The fraud scoring system 120 is communicatively coupled to the operational components 130 of the communication platform 100. The operational components 130 of the communication platform can include any servers, databases, processors or other resources that either define account configuration, account usage, or other aspects of the account within the platform. Preferably, the operational components include a call router that processes communication. In particular, the call router controls and facilitates the execution of a telephony application during a communication session. The various operational components 130 may additionally be used in enforcing some response to detection of illicit behavior by an account or sub-account.

2. Method for Preventing Illicit Use of a Communication Platform

Figure 2:
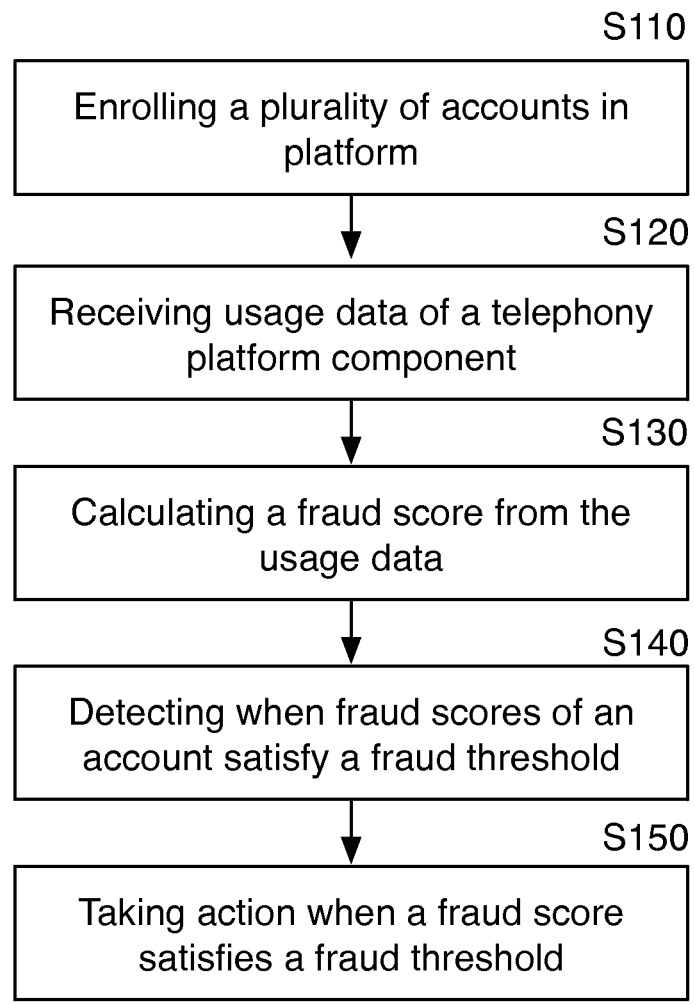
FIG. 2 is a flowchart representation of a preferred embodiment of the invention.

As shown in FIG. 2, a method for preventing illicit use of a communication platform in accordance with a preferred embodiment may include enrolling a plurality of accounts in a telecommunications platform block S110, at a fraud scoring system, receiving usage data of a telephony platform component block S120, calculating a fraud score from the usage data block S130, detecting when fraud scores of an account satisfy a fraud threshold block S140, and taking action when a fraud score satisfies a fraud threshold block S150. The method functions to enable heuristic based identification and prevention of telephony fraud. The method is preferably used to prevent illicit use cases in voice or video calls, short message service (SMS) messages, multimedia messaging service (MMS) messages, Fax, or any suitable form of telephony communication. The method can additionally be applied to IP based communication or proprietary communication channels such as SIP, Video conferencing, screen sharing or other suitable communication mediums. The method is preferably performed by a fraud scoring system which is a preferably a sub-component of telephony application platform such as the telephony platform described in U.S. patent application Ser. No. 12/417,630, filed 2 Apr. 2009 and titled "System and Method for Processing Telephony Sessions", which is incorporated in its entirety by this reference. Integration into a telephony platform preferably enables the gathering of usage data from a plurality of various telephony platform components. The telephony platform components are preferably those components that facilitate calls or messaging such as call databases or SMS databases, but may alternatively include components facilitating telephony application setup or operation such as account or credit card databases. The telephony platform is preferably a multitenant platform with multiple user accounts and optionally sub-accounts that independently use the platform. The telephony platform can be a self-sign up service, and the programmatic interface into the telephony platform can make it appear more appealing for illicit use. Entities can be freed of the hassle and complexity of arranging long-term contracts or other agreements that normally act as a barrier to telephony based fraud. The method is preferably applicable to preventing toll fraud in a telephony platform but may additionally or alternatively be used to prevent terms of service violations, denial of service attacks on a telephony platform or an outside system, suspicious behavior, credit card fraud, phishing attacks, and/or any suitable type of illicit use of a telephony platform.

The method is preferably capable of addressing internal telephony fraud (i.e., fraud performed by account holders on the telephony platform) and/or external telephony fraud (i.e., fraud attempts originating on outside systems but occurring through the telephony platform). The method is preferably capable of detecting coordinated illicit behavior performed across two or more accounts of the platform. Additionally or alternatively, the illicit behavior of a single account can additionally be addressed. The method preferably uses a heuristic based approach using rules defined in a rule set of the fraud scoring system. Rules used in the method can preferably be crafted and maintained by fraud analysts, which functions to enable analysts to use their unique insight into fraud scenarios to automatically detect future scenarios using the fraud scoring system. The method additionally can automate the detection and actions taken by fraud analysts for a system. The method may additionally include Bayesian learning, neural networks, reinforcement learning, cluster analysis or any suitable machine learning or algorithmic approaches to facilitate identifying illicit use cases. Preferably a combination of automatic fraud rule generation and fraud analyst input is used in during the method of the fraud scoring system. The method is preferably capable of identifying a wide variety of illicit use cases as defined in the rule set. When illicit use of the telephony platform is matches a rule, the fraud scoring system preferably acts to prevent that instance of illicit use from continuing.

Block S110, which includes enrolling a plurality of accounts in a telecommunications platform, functions to setup, configure, and instantiate multiple entities within the platform. An account within the telephony platform preferably has a unique identifier or uniquely identifying characteristics. Fraud detection is preferably detected within individual accounts or through two or more accounts that share usage data patterns (which often indicate a single entity is coordinating both accounts to distribute the signals of illicit behavior across multiple accounts). Enrolling an account may be initiated by a user through a user interface, but an account and/or a sub-account may alternatively be configured programmatically through an API such as a REST API of the platform. The enrollment may additionally include within one account, enrolling at least one sub-account that is managed by the first account. The sub-account (i.e., the child account) will often be an end customer of a service of the primary/parent account holder. For example, a customer care application may create a parent account, and within that account each end-customer is given a sub-account so that usage, data, and configuration can be independently managed. The parent account holder preferably manages these accounts. Sub-accounts are preferably created and managed through an API. The method can be particularly useful for systems that use sub-accounts in that, individual sub-accounts may be performing illicit behavior and the account holder may not have sufficient data when operating on top of the platform to detect the illicit behavior. The fraud detection service can be a beneficial service in promoting app developers to build on top of a platform.

Basic configuration of an account preferably occurs during enrollment but can be completed at a later time. Enrolling an account preferably includes an enrolling-account assigning at least one communication endpoint address to the account. Preferably, at least one phone number is associated with an account. Multiple phone numbers can additionally be configured. The communication endpoint may alternatively be a SIP address, email address, username, or any suitable address identifier used in routing communication to a destination. An assigned endpoint may be purchased/selected from the platform, ported from an existing system, or added to the account in any suitable manner.

The enrolling account additionally configures application resources. Preferably, an endpoint will be mapped to an application URI, which will be an external, internet-accessible resource that provides communication instructions for a communication session. Multiple application URI's may additionally be configured for different communication states or events. For example, there may be a primary application URI for incoming calls, an outgoing application URI that takes control of outgoing communication sessions, a fallback application may be used for when errors occur, there may be different application URIs for different mediums (e.g., voice, video, SMS, MMS, fax, eats.), different application URIs for different regions or originating endpoints. Each endpoint assigned to an account can additionally be uniquely configured. The configured application resources may alternatively or additionally include media files used in an application such as an application executable binary, instruction file, playable audio or video, or other suitable media resources.

The enrolling account may additionally configure billing information. The billing information will preferably include at least one credit card, but may alternatively be any suitable payment mechanism such as a bank account, links to an outside account with credit/points. The payment mechanism information will preferably include an account identifier (e.g., a credit card number), billing name, billing address. Multiple payment mechanisms may be setup.

Figure 3:
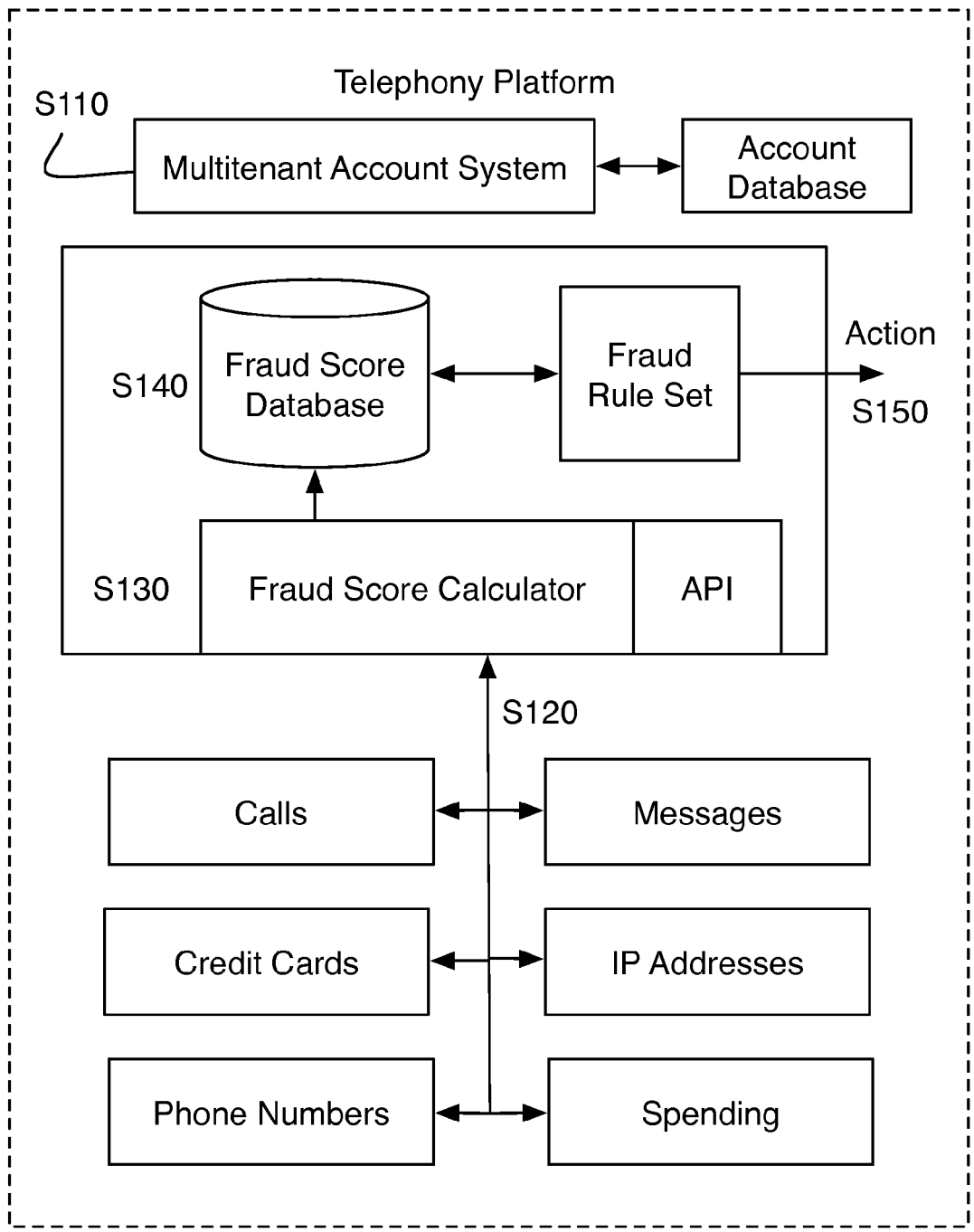
FIG. 3 is a schematic representation of a preferred embodiment of the invention.

Block S120, which recites at a fraud score system receiving usage data of a telephony platform component, functions to collect data used to calculate a fraud score. The usage data is preferably data collected and maintained independently from the fraud score system. The usage data thus typically reflects operational metrics of a telephony platform. For example, a call history database may store records of when calls where made and what the destination endpoints were for those calls. In this example, the primary purpose of the call history database may be for analytics but the data may additionally be used for calculating a fraud score. Alternatively, usage data may be collected with the explicit intent to measure data pertinent to calculating a fraud score. The fraud scoring system is preferably coupled through a network to a telephony platform component. More preferably the fraud scoring system is coupled through a network to a plurality of telephony platform components as shown in FIG. 3. A telephony platform component is preferably a machine that provides the usage data. The telephony platform components coupled to the fraud scoring system may include call history databases, messaging history databases, account databases, credit card hash databases, account databases, client device information databases, IP address databases, phone number databases, credit card or spending databases, API logs, and/or any suitable machine containing data useful for calculating a fraud score. The fraud scoring system is preferably configured to actively initiate communication with the telephony platform components, and the platform components preferably respond with any requested usage data. Alternatively, the coupled machines may independently send usage data to the fraud scoring system through a subscription or push-based service.

Figure 4:
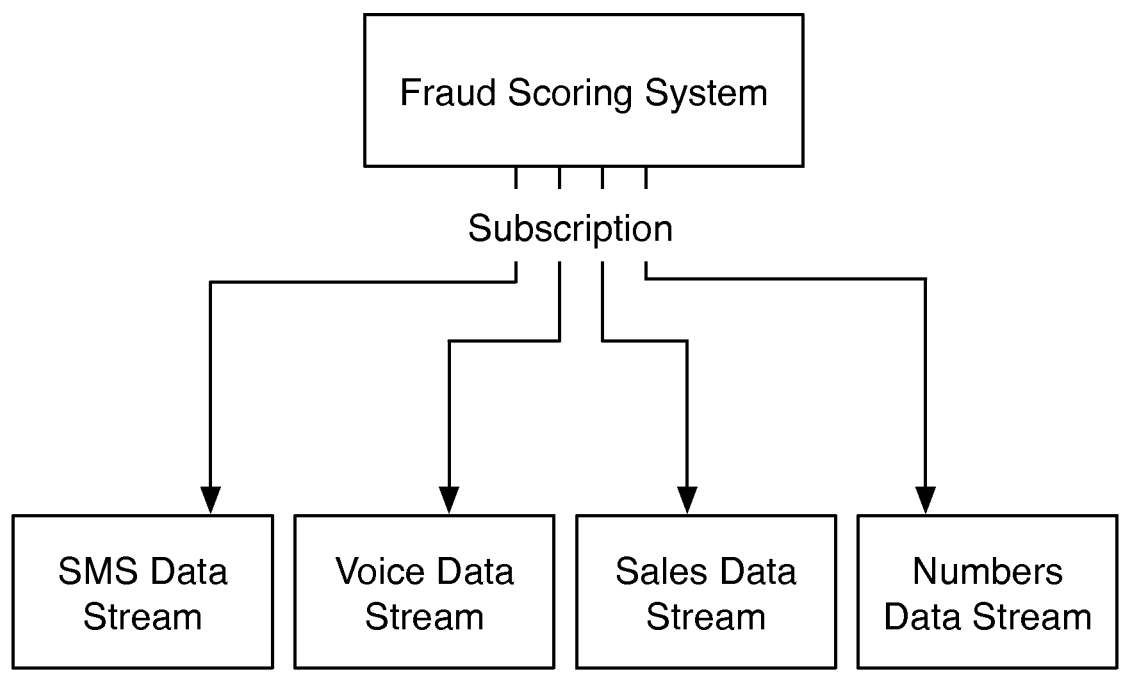
FIG. 4 is a schematic representation of a preferred embodiment of the invention for integrating a fraud scoring system with a data stream.
Figure 5:
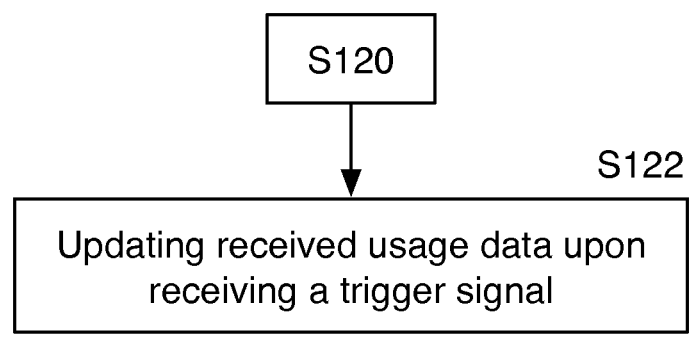
FIG. 5 is a flowchart depicting a variation of a preferred embodiment of the invention for updating received usage data upon receiving a trigger signal.
Figure 6:
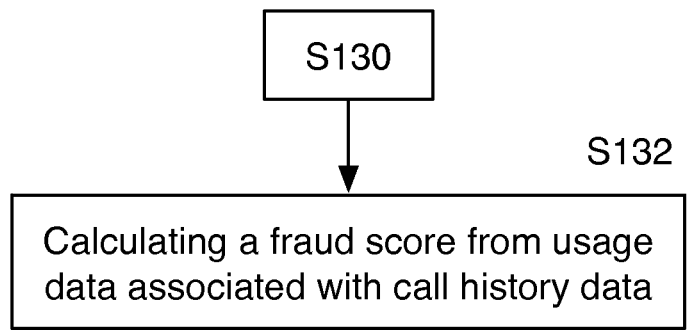
FIG. 6 is a flowchart depicting a variation of a preferred embodiment of the invention for calculating a fraud score from usage data associated with call history data.
Figure 7:
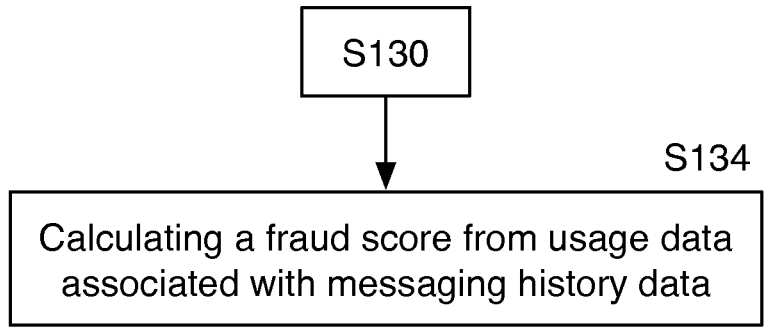
FIG. 7 is a flowchart depicting a variation of a preferred embodiment of the invention for calculating a fraud score from usage data associated with message history data.
Figure 8:
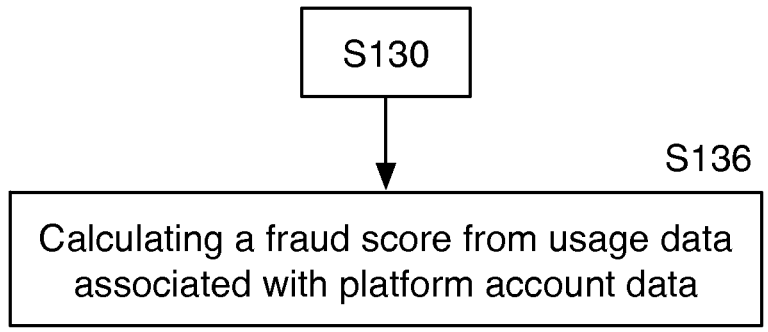
FIG. 8 is a flowchart depicting a variation of a preferred embodiment of the invention for calculating a fraud score from usage data associated with platform account data.

The fraud scoring system preferably refreshes usage data periodically. For example, fraud score system may receive new usage data from at least a subset of machines every half hour. In another variation, telephony platform components may send usage data continuously, when new data is collected, or for any suitable reason. In yet another variation, a fraud scoring system may be integrated into a data stream. In this variation data would preferably not need to be replicated or sent through a separate fraud scoring system. A fraud scoring system can preferably subscribe to designated data streams as shown in FIG. 4 but may alternatively be integrated into a data stream in any suitable manner. The fraud scoring system may additionally poll or actively request update usage data from components. Additionally or alternatively, a variation of a method of a preferred embodiment may include updating received usage data upon receiving a trigger signal Block S122 as shown in FIG. 5, which functions to enable fraud checking programmatically. In response to a trigger signal, the fraud scoring system preferably actively initiates the transmission of usage data from a telephony platform component to the fraud scoring system. The trigger signal is preferably an instruction associated with an application programming interface (API) call. The API call preferably causes usage data to be updated, a fraud score to be calculated, and action to be taken if appropriate. The API call may alternatively trigger a subset of the above steps. A telephony platform is preferably configured to send an API call to update the fraud scoring system when events occur that have a high correlation to fraud. For example, an API call to update the fraud scoring system may be sent before, while, or during updating an account, performing a credit card transaction, detecting high account concurrency, or during any suitable event. A fraud score API may additionally be used to perform other interactions with the fraud scoring system. For example, a fraud score API may trigger any suitable steps of the fraud scoring method; may create, edit, delete, or otherwise augment fraud rules, usage data, usage scores, fraud actions, or other parameters of the fraud scoring system; and/or interact with the fraud scoring system in any suitable way.

Block S130, which recites calculating a fraud score from the usage data, functions to process usage data to generate a metric that reflects the likelihood that illicit use of the telephony platform is occurring. Fraud scores are preferably calculated for a set of fraud rules. The set of fraud rules are used to calculate a set of fraud scores (e.g., measure or indicators of fraud). Additionally, fraud thresholds can define when particular types of actions are taken. A fraud rule preferably includes a usage condition, a usage data time window, and an account age condition. The fraud rules may additionally be conditions within a single account or pattern conditions across multiple accounts. The usage conditions are particular patterns in usage data (e.g., account configuration or communication history). The usage conditions are preferably particular patterns such as some threshold on the number or percentage of events or resources that would trigger activating the fraud rule (e.g., assigning the defined fraud score for that rule). The usage condition can additionally specify conditions found across multiple accounts. For example, a usage condition may be for identical/corresponding billing information configured in more than three accounts. The usage data time window is the window that is used to define what data is analyzed. Some exemplary time windows could include the past 24 hours, the past week, the past month, the past year, or across all data (e.g., no time window). The account age condition may define for how long the rule is monitored for an account. Some illicit use scenarios may only be seen with new accounts. For example, the account age condition may configure a fraud rule to apply to an account for the first week after the account is created. If the conditions of the fraud rule are satisfied a defined score is preferably assigned. These fraud scores are preferably stored per account. If the fraud rule is defined for condition patterns across multiple accounts, the fraud score is preferably assigned to each account. The fraud score is preferably a numeric value but may alternatively be a label or any suitable construct to communicate fraud likelihood. In this document we treat high fraud scores as indicating a greater likelihood of illicit use, but any suitable relationship may be defined. A fraud score is preferably associated with at least one key/identifier. The key may be an account, sub-account, an endpoint (e.g., a phone number), a credit card hash, or any suitable key. A plurality of fraud scores (e.g., one per fraud rule) is preferably calculated to monitor various entities and approaches to performing fraud in a telephony platform. For example, a series of fraud scores may be calculated to monitor accounts for one form of telephone fraud, while another series of fraud scores may be calculated to monitor credit card abuse across accounts. The fraud score is preferably indicative of activity during a specified time window, but may alternatively be an aggregate value (preferably factoring in older fraud scores to reflect multiple time windows). Calculation of fraud scores may additionally involve creating associations between subsets of the received usage data. Associations can be made based on user accounts, credit cards used to pay for accounts, endpoints or endpoint prefixes, source or destination carriers, and/or any suitable parameter that can be used to associate various data points in the usage data.

As described, fraud scores are preferably calculated to generate metrics that reflect the likelihood of fraud. These metrics may be associated with various parameters or combination of parameters of a telephony platform. Block S130 preferably includes calculating a fraud score from usage data associated with call history data Block S132, calculating a fraud score from usage data associated with messaging history data S134, and/or calculating a fraud score from usage data associated with platform account configuration data S136, but any suitable usage data may alternatively be used in calculating fraud score. Correspondingly, the block S130 preferably includes at least one fraud rule of the set of fraud rules including identifying communication-application configuration shared between at least two accounts, identifying shared patterns of media resource usage in two accounts, detecting shared billing information across two or more accounts, detecting communication history patterns across at least two accounts, and other suitable fraud rule conditions that are defined for patterns in usage data between multiple accounts.

Block S132, which recites calculating a fraud score from usage data associated with call history data, functions to create a fraud score based on patterns in calls occurring on the telephony platform. Several different parameters of a call may have been measured and included in the usage data. For example, call duration, account(s) associated with a call, call destination endpoints, caller endpoints, carrier origin of a call, destination carrier, frequency of calls, number of concurrent calls for an account, or any suitable parameter of call data. Such call related usage data can preferably be used to calculate fraud scores based on various heuristics. In one variation, high call concurrency (i.e., multiple calls occurring on the telephony platform simultaneously) for a new account is indicative of illicit use of the telephony platform. A fraud score that reflects this is preferably calculated from such data. In this variation, the fraud score preferably has a direct relationship to concurrency and an inverse relationship to the age of the account. In another variation, numerous call endpoints matching designated prefix patterns may additionally be an indicator of illicit use. A fraud score that reflects this is preferably calculated. Preferably, a fraud rule is defined for each communication history condition or set of conditions. Additionally, audio or video of a call may be used in calculating a fraud score. For example, white noise analysis of a call may be included in or extracted from usage data. White noise analysis may enable the fraud scoring system to detect if a phone call had anyone on either side of a call. In this example, a long silent phone call may be associated with illicit use of the telephony platform, and the white noise detection could be used to calculate a fraud score that reflects this heuristic.

Block S134, which recites calculating a fraud score from usage data associated with messaging history data, functions to create a fraud score based on patterns in messages occurring on the telephony platform. Messaging history data may include any data related to SMS, MMS, or other suitable messages communicated through the telephony platform. Calculation of a fraud score may include the use of usage data analogous to the usage data described above for call data, such as message endpoints, account(s) associated with a message, message frequency, message frequency as a factor of account age, carrier origin of a message, carrier destination of a message, or any suitable parameter of a message or messages sent through the telephony platform. Message content and message conversations conveyed in usage data of the messages may additionally be used to calculate a fraud score. In one variation, messages replying to account messages that instruct the sender to stop sending messages (e.g., a message with the message 'STOP') preferably contribute towards a higher fraud score. Accounts that receive a higher percentage of stop-messages are more likely to be practicing behavior that is undesirable to users. In an alternative variation, if a large number of spam-like text messages are delivered to endpoints matching a prefix and no stop-messages are received, this may also be an indicator of illicit behavior (e.g., a nefarious user may be trying to terminate as many text messages to a particular carrier).

Block S136, which recites calculating a fraud score from usage data associated with platform account configuration data, functions to use metrics collected from the telephony platform that do not directly relate to voice, video or messaging. Usage data associated with platform account configuration data may include information pertaining to user accounts, credit cards, endpoints, client devices, telephony application URI's, or any suitable platform account data. The configuration data preferably includes communication-application configuration, which includes variables and resources used in customizing and defining the application(s) of the account. One fraud rule may be defined for a condition of identifying communication-application configuration shared between at least two accounts. If multiple accounts have the same application configuration, then this can be used as a signal that the two accounts are used for the same task. Outside entities may set up multiple accounts to perform the same task to avoid detection, but identical application configuration can be a signal that the accounts are managed by the same entity or two cooperating entities. Preferably, applications are defined by application URIs that are associated with/mapped to communication endpoints. String comparisons of the URIs can be performed to identify matching applications used in multiple accounts. In some situations, some application URI's may be whitelisted so that they can be used in multiple accounts. In a similar, variation the actual application media resources consumed during execution of an application can be used to indicate similar functionality. A communication platform may transfer application state to various application URIs during a communication session. These application URIs can be similarly tracked and compared. Also media such as the instruction documents (telephony instructions in an XML document), audio files, video files, and other resources can be fingerprinted or otherwise processed to create an identifier that can be used to detect similar or identical media resources. Fingerprinting data preferably includes creating an identifier of the content of the media file. The fingerprint identifier can be preferably easily compared to other fingerprint identifiers in other accounts to determine if identical or substantially similar media is used. A fingerprint identifier preferably functions so that media can be matched despite variations in the encoding of the content. For example two images of the same picture but of slightly different dimensions and size ratios can be shown to be matching. Alternatively, the raw file may be compared. Media resource usage during communication sessions can also be used as signals of illicit behavior. For example, an image sent over MMS by one account may be fingerprinted. A second account additionally sends an image of MMS and the image is similarly fingerprinted. The fingerprint identifiers are then compared, and if they indicate the image content matches, this may trigger a fraud rule around two accounts sending identical images over MMS. Media fingerprinting can similarly be applied to audio, video and other suitable media mediums.

In one variation, calculating a fraud score from usage data associated with credit card data preferably involves comparing hashes of credit card numbers. By comparing billing information within and across accounts, the fraud scoring system functions to check diversity of payment mechanism. Payment mechanisms are preferably not shared across numerous accounts. This can be a signal that one entity is setting up multiple accounts for some reason. Within an account the payment mechanisms preferably have little diversity. If several credit cards with multiple names and addresses may be a sign that stolen credit cards are being used. As an example, a plurality of new accounts created and set up using the same credit card may be an indicator of illicit use. Credit card hash records for new accounts are preferably compared to identify credit cards used multiple times. In this variation, a credit card used multiple times for different accounts would preferably contribute to a higher fraud score. Similarly, many telephony applications allow accounts to set up an application to handle calls or messages by specifying a URI. In one variation, if one URI is configured for a plurality of new accounts, then this may indicate illicit use as it indicates one entity is setting up multiple accounts for the same purpose.

Block S140, which recites detecting when fraud scores of an account satisfy a fraud threshold, function to monitor and assess when a scenario of illicit behavior is occurring based on the fraud scores. Block S140 preferably includes storing/recording the fraud score. As described above, the fraud scores are preferably indicative of a fraud score for a particular time window, but may alternatively be an aggregate metric. The fraud scores are preferably stored such that an associated account, endpoint, application, and/or any suitable key may be referenced when retrieving data. In one variation block storing of the fraud scores is optional, and assessment can be performed directly after calculating fraud scores, without persistently storing fraud scores. Preferably, the same set of fraud rules are used in calculating fraud scores across all the accounts/sub-accounts. Fraud thresholds can define when particular types of actions are taken. In one implementation, the fraud scores associated with an account or sub-account are preferably summed, and if the total fraud score is above a define fraud score threshold a response is made in block S150. Additionally, there may be different levels of fraud thresholds. For example a fraud threshold may be defined for fraud scores from 20-50, a second fraud threshold for 51-75, and a third fraud threshold for scores over 76. These three fraud thresholds can define three levels of actions taken in block S150. The fraud reaction can alternatively be based on the fraud scores of a particular fraud rules. For example, specific fraud rules (when satisfied or for certain scores) may define a reaction of flagging an account or throttling an account, while some fraud rules may define more severe illicit behavior and can initiate automatic termination of the account.

Block S150, which recites taking action when a fraud score satisfies a fraud threshold, functions to react to fraud scores that indicate illicit behavior. The reaction to a fraud score may include flagging the account, throttling communication of an account, requesting additional billing information, notifying account holder, notifying an analyst of the communication platform, performing additional fraud detection analysis on the account, blocking particular actions on the account, or performing any suitable action. In a sub-account variation, the parent account of a sub-account is preferably notified of the sub-account illicit behavior. The notification can be an email notification, a message within the communication platform web platform, or notification made through the API of the communication platform. Account holders may have multiple sub-accounts using their service provided on top of the communication platform. By performing the fraud regulation by sub-accounts, the communication platform can avoid taking action against the account itself since many sub-accounts may be using the communication platform in a proper manner. This functions to simplify and abstract the fraud prevention aspect away from account holders such that the communication platform can handle illicit use detection. A fraud scoring system preferably includes a set of fraud rules (i.e., a rule set) stored using any suitable schema. The rule set preferably enables various heuristics to be configured and/or updated to keep current with the latest fraud attempts. Fraud score patterns may include thresholds for a particular fraud score or alternatively a group of fraud scores. Some exemplary fraud score patterns may include taking action when there are more than a specified number of international calls lasting longer than a specified amount of time, when an average length of international calls is greater than a specified amount of time, when greater than a specified number of outbound SMS messages to a classification of prefixes (e.g., UK prefixes) are made, when more than a specified number of unique credit cards are added to an account, when the credit cards of an account use more than a specified number of zip codes, when one credit card is used on more than a specified number of accounts, when one IP address is used across more than a specified number of accounts, when the account balance is more than a specified amount for an account and the age of the account is less than a specified number of days, when the answer rate of outbound calls is less than a specified percentage and/or when any suitable pattern is satisfied, As shown in FIG. 9, rule sets may be dependent on measured metrics in combination with a threshold, time period for the metrics, and account age. Alternatively, any suitable parameters may be specified to determine a rule set. Fraud score patterns may alternatively be trending patterns from a time series of related fraud scores. Fraud reactions preferably include suspending an account, blacklisting credit card numbers, blacklisting application URI's or IP's, rate-limiting services provided to an offending account, remove or adjust services provided to an offending account (e.g., remove international services), flag the account for a human fraud analyst to investigate, and/or any suitable course of action. The fraud reaction is preferably signaled to the telephony platform, and the resulting reaction preferably alters behavior of the telephony platform to prevent a suspected case of illicit use of the platform. There may additionally be different level of responses based on the severity of the fraud score, and fraud reactions may be applied in stages if the fraud score does not subside.

Figure 10:
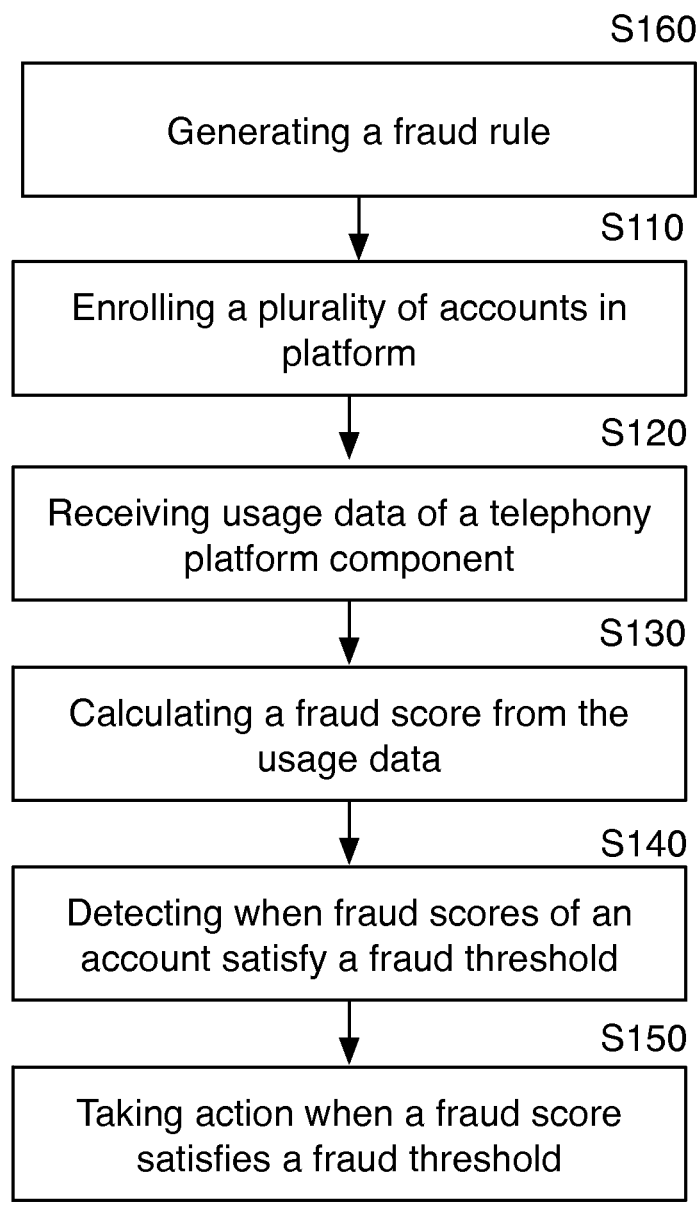
FIG. 10 is a flowchart depicting a variation of a preferred embodiment of the invention for generating a fraud rule.

Additionally or alternatively, a method of a preferred embodiment may include generating a fraud rule block S160 as shown in FIG. 10, which functions to produce a fraud score based on collected data. In one variation, a fraud score set is preferably predominately generated by fraud analysts. This preferably enables fraud analysts to apply unique insight into fraud attempts to enable automatic detection. In a variation that implements block S150, at least a subset of the fraud rule set is generated through analysis of the data. As mention above Bayesian learning, neural networks, reinforcement learning, cluster analysis or any suitable machine learning techniques may be used to extract rules to identify fraud scenarios. The generating of a fraud rule may be active or reactive. Active generation of a fraud rule will preferably automatically generate a rule based on observed data. Reactive fraud rule generation preferably generates a fraud rule after a fraud scenario has happened. Data from the time of the fraud can preferably be replayed such that a fraud rule may be generated that would have set the fraud score to reflect the occurrence of the fraud scenario.

An alternative embodiment preferably implements the above methods in a computer-readable medium storing computer-readable instructions. The instructions are preferably executed by computer-executable components preferably integrated with a fraud scoring system. The fraud scoring system preferably includes a fraud rule set and a fraud scoring API. The fraud scoring system is preferably integrated into a telephony platform capable of facilitating voice, video, or message communication. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   enrolling a plurality of accounts on a telecommunications platform, wherein an account includes account configuration;
   at a fraud detection system of the telecommunications platform, receiving account usage data, wherein the account usage data includes at least communication configuration data and billing configuration data of account configuration and further includes communication history of the plurality of accounts;
   calculating fraud scores of a set of fraud rules from the usage data, wherein at least a sub-set of the fraud rules include conditions of usage data patterns between at least two accounts;
   detecting when the fraud scores of an account satisfy a fraud threshold;
   initiating an action response when a fraud score satisfies the fraud threshold.

2. The method of claim 1, wherein communication configuration includes communication-application configuration; wherein at least one fraud rule of the sub-set of fraud rules comprises identifying communication-application configuration shared between at least two accounts.

3. The method of claim 2, wherein the communication-application configuration is an application URI string.

4. The method of claim 1, wherein the communication history includes media resource usage; and wherein at least one fraud rule of the sub-set of fraud rules comprises identifying shared patterns of media resource usage in two accounts.

5. The method of claim 1, wherein at least one fraud rule of the sub-set of fraud rules comprises detecting shared billing information across three or more accounts.

6. The method of claim 5, wherein the shared billing information can include a shared credit card or shared billing address.

7. The method of claim 1, wherein a fraud rule includes at least one usage pattern condition; and where calculating a fraud rule comprises assigning a defined score if the conditions of the fraud rule are satisfied; and wherein detecting when the fraud scores of an account satisfy a fraud threshold comprises adding fraud scores of the set of fraud rules.

8. The method of claim 7, wherein a fraud rule includes a usage data time window, and an account age condition.

9. The method of claim 1, further comprising automatically generating a fraud rule through usage data anomaly detection; and adding the fraud score to the set of fraud scores.

10. The method of claim 1, wherein initiating an action response includes flagging the associated account; and further comprising providing an analyst interface wherein an analyst can modify the set of fraud rules and modify flagged accounts.

11. The method of claim 1, further comprising a second sub-set of fraud rules that include conditions of usage data patterns within the account.

12. The method of claim 1, wherein the plurality of accounts include accounts and sub-accounts.

* * * * *